(12) United States Patent
Dauben et al.

(10) Patent No.: US 6,576,727 B1
(45) Date of Patent: Jun. 10, 2003

(54) CATALYST SYSTEM FOR GAS PHASE POLYMERIZATION OF CONJUGATED DIENES

(75) Inventors: Michael Dauben, Neuss (DE); Jürgen Schneider, Köln (DE); Gerd Sylvester, Leverkusen (DE); Nobert Steinhauser, Monheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 315 days.

(21) Appl. No.: 09/600,283

(22) PCT Filed: Jan. 7, 1999

(86) PCT No.: PCT/EP99/00032

§ 371 (c)(1),
(2), (4) Date: Jul. 13, 2000

(87) PCT Pub. No.: WO99/37694

PCT Pub. Date: Jul. 29, 1999

(30) Foreign Application Priority Data

Jan. 20, 1998 (DE) .......................................... 198 01 857

(51) Int. Cl.[7] .................................................. C08F 4/44
(52) U.S. Cl. ...................... 526/164; 526/335; 502/117; 502/116; 502/103; 502/120
(58) Field of Search ................................ 526/335, 164; 502/117, 116, 103, 120

(56) References Cited

U.S. PATENT DOCUMENTS

| | | | |
|---|---|---|---|
| 4,898,847 A | * | 2/1990 | Salajka et al. ............... 522/110 |
| 5,126,463 A | | 6/1992 | Ramachandran et al. ... 549/262 |
| 5,225,458 A | | 7/1993 | Bailly et al. ................. 523/220 |

FOREIGN PATENT DOCUMENTS

| | | |
|---|---|---|
| EP | 0 530 709 | 3/1993 |
| EP | 0 647 657 * | 4/1995 |
| EP | 0 704 461 | 4/1996 |
| EP | 0 605 001 | 8/1996 |
| WO | 96/04323 | 2/1996 |
| WO | 97/08211 | 3/1997 |

OTHER PUBLICATIONS

Ullmanns Enzyclopädie der technischen Chemie. Vol. 21, pp. 439–476, (date unavailable) Siliciumdioxid.
Ullmanns Enzyclopädie der technischen Chemie. Vol. 23, pp. 311–326, (date unavailable) Ton und Tonminerals.
Ullmanns Enzyclopädie der technischen Chemie. Vol. 14, pp. 633–651(date unavailable) Kohlenstoff.
Ullmanns Enzyclopädie der technischen Chemie. Vol. 24, pp. 575–578, Mangel, (date unavailable), Zeolithe.
Ullmanns Enzyclopädie der technischen Chemie. Vol. 17, pp. 9–18, Pupp, (date unavailable) Molekularsiebe.

* cited by examiner

*Primary Examiner*—Ling-Siu Choi
(74) *Attorney, Agent, or Firm*—Joseph C. Gil; Noland J. Cheung; Jennifer R. Seng

(57) ABSTRACT

The present invention relates to a catalyst system for gas phase polymerization of conjugated dienes, consisting of a rare earth compound, an aluminum organic compound, a further Lewis acid, optionally a conjugated diene, an inert inorganic or organic support and a co-catalyst applied to an inorganic support, in order to improve the flowability of rubber thus produced.

10 Claims, No Drawings

CATALYST SYSTEM FOR GAS PHASE POLYMERIZATION OF CONJUGATED DIENES

The invention relates to a catalyst system for the gas-phase polymerization of conjugated dienes, consisting of a rare earth compound, an organoaluminium compound, a further Lewis acid, optionally a conjugated diene, an inert, inorganic or organic support material and, additionally, a co-catalyst applied to an inorganic or organic support material, with an improvement in the flowability of the rubber produced thereby.

Polybutadiene having a high content of cis-1,4 units has for a long time been produced on a commercial scale and used in the manufacture of tires and other rubber products.

For environmental reasons, attempts are being made to carry out the polymerization of this and other conjugated dienes in the gas phase, since no solvents have to be used in that case and emission and waste water pollution can be reduced.

In addition, novel rubbers having particular product properties can be produced by the process. In particular, fillers dispersed especially well in the polymer are obtained if they are present in the polymerization as the support for the active component of the catalyst.

It is already known from EP-B-0647657 that the polymerization of conjugated dienes, especially of butadiene, can be carried out in the gas phase, without the addition of solvents, if a catalyst system based on rare earth compounds and an organoaluminum compound on a particulate, inert, inorganic solid having a specific surface area greater than 10 m²/g (BET) and a pore volume of from 0.3 to 15 ml/g is used.

EP-B-0605001 claims the use of silica of a particular particle size as the support material and inert particulate materials to improve the flowability of tacky polymers.

EP-A-0442452 describes the use of inert particulate materials having particle diameters of from 0.01 to 10 μm to improve the flowability of tacky polymers in the case of polymerizations above the softening temperature of the said tacky polymers.

EP-A-0530709 describes the use of inert particulate materials having particle diameters of from 0.01 to 150 μm to improve the flowability of tacky polymers in the case of polymerizations above the softening temperature of the said tacky polymers.

In WO-88/02379 there is claimed the use of inert pulverulent inorganic materials in amounts of from 0.005 to 0.2 wt. %, based on the fluidized bed, to improve the flowability of polymers.

WO-96/04323 describes the use of inert particulate materials to improve the flowability of BR and IR in the case of polymerizations wherein the reactor temperature is below the dew point of one of the constituents of the circulating gas.

In EP-A-704464 there is described a resin particle having a tacky core and a non-tacky shell consisting of from 10 to 90% ethylene.

EP-A-570960 describes a resin particle having a tacky core and a non-tacky shell of inert particulate particles.

In all the processes described above, inert materials are used, with great importance being attached to the term inert.

U.S. Pat. No. 5,162,463, on the other hand, teaches that the agglomeration of the tacky particles in a fluidized bed can be avoided if an inert material coated with a polysiloxane coating is metered into the fluidized bed.

Finally, WO-97/08211 describes the addition of stabilizers in supported form.

It was completely unexpected to the person skilled in the art that, by using particulate materials coated with co-catalysts, it is possible very considerably to increase the activity of the catalyst system protected, inter alia, in EP-B-0647657 and consisting of A) a rare earth alcoholate (I),
  a rare earth carboxylate (II),
  a complex compound of rare earths with diketones (III) and/or
  an addition compound of the rare earth halides with an oxygen or nitrogen donor compound (IV), of the following formulae:

(RO)₃M (I)

(R—CO₂)₃M (II)

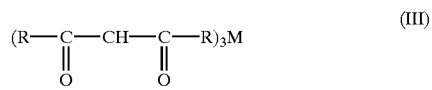

(III)

and

MX₃·y donor (IV),

B) an aluminum trialkyl, a dialkylaluminum hydride and/or an alumoxane of formulae (V) to (VII):

Al(H)ₓ(R¹)₃₋ₓ (V)

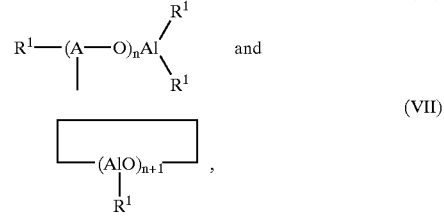

(VI)

R¹—(A—O)ₙAl(R¹)(R¹)   and (VII)

—(AlO)ₙ₊₁—
  |
  R¹ wherein in the formulae
M represents a trivalent rare earth element having an atomic number from 57 to 71,
the radicals
R, which may be the same or different, represent an alkyl radical having C₁–C₂₀,
the radicals
R¹, which may be the same or different, represent a C₁–C₁₀-alkyl radical,
X represents chlorine, bromine or iodine,
x represents 0 or 1,
y represents from 1 to 6, and
n represents from 1 to 50, C) a further Lewis acid, and
D) a particulate, inorganic or organic solid having a specific surface area greater than 10 m²/g (BET), a particle size of from 10 to 1000 μm, preferably from 100 to 500 μm, and a pore volume of from 0.3 to 15 ml/g (where carbon black is used, additionally having, a DBP adsorption of more a than 30 ml/100 g).

DETAILED DESCRIPTION OF THE INVENTION

Suitable co-catalysts are all constituents having co-catalytic activity, especially the materials listed under B). Suitable support materials for these co-catalysts are all particulate materials, especially the materials listed under D).

If, on the other hand, a co-catalyst described under B) (e.g. aluminum alkyl) in liquid phase, whether it be in concentrated form or in dilute solution, is metered into the reaction chamber before and/or during the polymerization, the agitated reaction mass, for example in a stirred fixed bed or a fluidized bed, enters into an unstable state of fluidization as a result of spontaneous agglomeration and conglutination. The result is a drastically shortened useful life of the reactor. That is not the case if the supported co-catalyst solids according to the invention are metered into the gas-phase process and they are able to produce the desired action by intimate contact with the coated Nd catalyst described above or, inter alia, in EP-B-0647657. Furthermore, distribution within the reactor or the fluidized mass is markedly more homogeneous than is the case, for example, when a liquid co-catalyst material is injected into the reaction volume.

Also completely unexpected was the effect that the activity of the co-catalyst supported separately is markedly higher as compared with the same amount of co-catalyst supported together with the catalyst. The acceleration of the reaction, or increase in activity, achieved as a result of the co-catalyst's being supported separately is far greater than 30%, as compared with the co-catalyst supported together with the catalyst.

In component A), M represents a trivalent rare earth element having an atomic number in the periodic system of from 57 to 71. Preference is given to those compounds in which M represents lathanum, cerium, praseodymium or neodymium or a mixture of rare earth elements that contains at least one of the elements lanthanum, cerium, praseodymium or neodymium in an amount of at least 10 wt. %. Particular preference is given to compounds in which M represents lanthanum or neodymium or a mixture of rare earths that contains lanthanum or neodymium in an amount of at least 30 wt. %.

There may be mentioned as radicals R in formulae (I) to (IV) in particular straight-chained or branched alkyl radicals having from 1 to 20 carbon atoms, preferably from 1 to 15 carbon atoms, such as methyl, ethyl, n-propyl, n-butyl, n-pentyl, isopropyl, isobutyl, tert-butyl, 2-ethylhexyl, neopentyl, neooctyl, neodecyl, neododecyl.

Examples of alcoholates of component A) are: neodymium(III) n-propanolate, neodymium(III) n-butanolate, neodymium(III) n-decanolate, neodymium (III) isopropanolate, neodymium(III) 2-ethylhexanolate, praseodymium(III) n-propanolate, praseodymium(III) n-butanolate, praseodymium(III) n-decanolate, praseodymium(III) isopropanolate, praseodymium(III) 2-ethylhexanolate, lanthanum(III) n-propanolate, lanthanum (III) n-butanolate, lanthanum(III) n-decanolate, lanthanum (III) isopropanolate, lanthanum(III) 2-ethylhexanolate, preferably neodymium(III) n-butanolate, neodymium(III) n-decanolate, neodymium(III) 2-ethylhexanolate.

Suitable carboxylates of component A) are: lanthanum (III) propionate, lanthanum(III) diethylacetate, lanthanum (III) 2-ethylhexanoate, lanthanum(III) stearate, lanthanum (III) benzoate, lanthanum(III) cyclohexanecarboxylate, lanthanum(III) oleate, lanthanum(III) versatate, lanthanum (III) naphthenate, praseodymium(III) propionate, praseodymium(III) diethylacetate, praseodymium(III) 2-ethylhexanoate, praseodymium(III) stearate, praseodymium(III) benzoate, praseodymium(III) cyclohexanecarboxylate, praseodymium(III) oleate, praseodymium(III) versatate, praseodymium(III) naphthenate, neodymium(III) propionate, neodymium(III) diethylacetate, neodymium(III) 2-ethylhexanoate, neodymium(III) stearate, neodymium(III) benzoate, neodymium(III) cyclohexanecarboxylate, neodymium(III) oleate, neodymium(III) versatate, neodymium(III) naphthenate, preferably neodymium(III) 2-ethylhexanoate, neodymium(III) versatate, neodymium(III) naphthenate. Particular preference is given to the use of neodymium versatate.

There may be mentioned as complex compounds of component A): lanthanum(III) acetylacetonate, praseodymium(III) acetylacetonate, neodymium(III) acetylacetonate, preferably neodymium(III) acetylacetonate.

Examples of addition compounds of component A) with donors which may be mentioned are: lanthanum(III) chloride with tributyl phosphate, lanthanum(III) chloride with tetrahydrofuran, lanthanum(III) chloride with isopropanol, lanthanum(III) chloride with pyridine, lanthanum(III) chloride with 2-ethylhexanol, lanthanum(III) chloride with ethanol, praseodymium(III) chloride with tributyl phosphate, praseodymium(III) chloride with tetrahydrofuran, praseodymium(III) chloride with isopropanol, praseodymium(III) chloride with pyridine, praseodymium(III) chloride with 2-ethylhexanol, praseodymium(III) chloride with ethanol, neodymium(III) chloride with tributyl phosphate, neodymium(III) chloride with tetrahydrofuran, neodymium(III) chloride with isopropanol, neodymium(III) chloride with pyridine, neodymium(III) chloride with 2-ethylhexanol, neodymium (III) chloride with ethanol, lanthanum(III) bromide with tributyl phosphate, lanthanum(III) bromide with tetrahydrofuran, lanthanum(III) bromide with isopropanol, lanthanum(III) bromide with pyridine, lanthanum(III) bromide with 2-ethylhexanol, lanthanum(III) bromide with ethanol, praseodymium(III) bromide with tributyl phosphate, praseodymium(II) bromide with tetrahydrofuran, praseodymium(III) bromide with isopropanol, praseodymium(III) bromide with pyridine, praseodymium (III) bromide with 2-ethylhexanol, praseodymium(III) bromide with ethanol, neodymium(III) bromide with tributyl phosphate, neodymium(III) bromide with tetrahydrofuran, neodymium(III) bromide with isopropanol, neodymium(III) bromide with pyridine, neodymium(III) bromide with 2-ethylhexanol, neodymium(III) bromide with ethanol, preferably lanthanum(III) chloride with tributyl phosphate, lanthanum(III) chloride with pyridine, lanthanum(III) chloride with 2-ethylhexanol, praseodymium(III) chloride with tributyl phosphate, praseodymium(III) chloride with 2-ethylhexanol, neodymium(III) chloride with tributyl phosphate, neodymium(III) chloride with tetrahydrofuran, neodymium(III) chloride with 2-ethylhexanol, neodymium (III) chloride with pyridine, neodymium(III) chloride with 2-ethylhexanol, neodymium(III) chloride with ethanol.

The rare earth compounds can be used individually or in admixture with one another.

A preferred embodiment is given to the use of neodymium versatate, neodymium octanoate and/or neodymium naphthenate as component A).

In formulae (V) to (VII) of component B), $R^1$ represents a straight-chained or branched alkyl radical having from 1 to 10 carbon atoms, preferably from 1 to 4 carbon atoms. Examples of suitable aluminum alkyls of formula (V) are: trimethylaluminum, triethylaluminum, tri-n-propylaluminum, triisopropylaluminum, tri-n-butylaluminum, triisobutylaluminum, tripentylaluminum, trihexylaluminum, tricyclohexyluimium, trioctylaluminum, diethylaluminum hydride, di-n-butylaluminum hydride and diisobutylaluminum hydride.

Preference is given to triethylaluminum, triisobutylaluminum and diisobutylaluminium hydride. Particular preference is given to diisobutylaluminium hydride.

The following are mentioned as examples of alumoxanes (VI) and (VII): methylalumoxane, ethylalumoxane and isobutylalumoxane, preferably methylalumoxane and isobutylalumoxane.

So-called Lewis acids are used as component C). Examples which may be mentioned are the organometal halides in which the metal atom belongs to group 3a) or 4a), as well as halides of the elements of groups 3a), 4a) and 5a) of the periodic system, as described in "Handbook of Chemistry and Physics", 45th edition, 1964–1965. Special mention is made of the following:

methylaluminum dibromide, methylaluminum dichloride, ethylaluminum dibromide, ethylaluminum dichloride, butylaluminum dibromide, butylaluminium dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminium sesquichloride, ethylaluminum sesquibromide, ethylaluminum sesquichloride, aluminum tribromide, antimony trichloride, antimony pentachloride, phosphorus trichloride, phosphorus pentachloride, tin tetrachloride.

There are preferably used diethylaluminum chloride, ethylaluminum sesquichloride, ethylaluminum dichloride, diethylaluminum bromide, ethylaluminum sesquibromide and/or ethylaluminum dibromide.

It is also possible to use as component C) the reaction products of aluminum compounds, as described as component B), with halogens or halogen compounds, for example triethylaluminum with bromine or triethylaluminum with butyl chloride. In that case, the reaction can be carried out separately, or the amount of the alkylaluminum compound required for the reaction is added to the amount required as component B).

Ethylaluminum sesquichloride, butyl chloride and butyl bromide are preferred.

There are used as component D) particulate, inorganic or organic solids having a specific surface area greater than 10 m$^2$/g, preferably from 10 to 1000 m$^2$/g (BET), a particle size of from 10 to 1000 μm, preferably from 50 to 500 μm, and a pore volume of from 0.3 to 15 ml/g, preferably from 0.5 to 5 ml/g. When carbon blacks are used, the DBP adsorption is used as a criterion for suitability in addition to the pore volume. The DBP adsorption is to be from 10 to 300 ml/100 g, preferably from 60 to 150 ml/100 g, particularly preferably from 90 to 130 ml/100 g.

The specific surface area (BET) is determined in the conventional manner according to S. Brunauer, P. H. Emmet and Teller, J. Anorg. Chem. Soc. 60 (2), 309 (1938), the pore volume is determined by the centrifugation method according to M. McDaniel, J. Colloid Interface Sci. 78, 31 (1980), and the DBP adsorption is determined according to DIN 53 601.

Suitable inorganic solids are in particular silica gels, precipitated silicas, clays, aluminosilicates, talcum, zeolites, carbon black, inorganic oxides, such as silicon dioxide, aluminum oxide, magnesium oxide, titanium dioxide, silicon carbide. Silica gels, precipitated silicas, zeolites and carbon black are preferred, with precipitated silicas and carbon black being especially preferred. Inert in this case is to be understood as meaning that the solids are of such a nature, or have been so pre-treated by means of pre-treatment, such as, for example, calcination, that the reactive surface does not hinder the formation of an active catalyst, or reacts with the monomers.

The mentioned inorganic solids, which satisfy the above-mentioned specification and therefore are suitable for use, are described in greater detail, for example, in Ullmanns Enzyclopädie der technischen Chemie, Volume 21, p. 439 ff (silica gels), Volume 23, p. 311 ff (clays), Volume 14, p. 633 ff (carbon blacks), Volume 24, p. 575 ff and Volume 17, p. 9 ff (zeolites).

The inorganic solids can be used individually or in admixture with one another.

Suitable organic solids are also polymeric materials, preferably in the form of free-flowing powders, which are of such a nature, or have been so pre-treated by means of pre-treatment, such as, for example, drying, that the reactive surface does not hinder the formation of an active catalyst, or reacts with the monomers, have a particle size in the range of from 10 to 1000 μm and which have a pore volume in the range of from 0.3 to 15 ml/g. An example of such a material is pulverulent polypropylene.

The molar ratio in which catalyst components A) to D) are used can be varied within wide limits.

The molar ratio of component A) to component B) is from 1:1 to 1:1000, preferably from 1:3 to 1:200, particularly preferably from 1:3 to 1:100. The molar ratio of component A) to component C) is from 1:0.4 to 1:15, preferably from 1:0.5 to 1:8.

From 0.1 mmol to 1 mol of component A), preferably from 1 to 50 mmol of component A), is used per 100 g of component D).

It is also possible to add to catalyst components A) to D) a further component E). Component E) is a conjugated diene, which may be the same as the diene which is subsequently to be polymerized with the catalyst. The use of butadiene and isoprene is preferred.

If component E) is added to the catalyst, the amount of E) is preferably from 1 to 1000 mol, based on 1 mol of component A), more preferably from 1 to 100 mol, based on 1 mol of component A). Particular preference is given to the use of from 1 to 50 mol of E), based on 1 mol of component A).

The supported co-catalyst according to the invention is prepared by applying a solution of the co-catalyst(s) preferably described under B) to the particulate solid D).

Preferably before, during and, optionally, after application of the co-catalyst solution, the solid is agitated, for example in a stirrer vessel with a conventional stirring unit, such as, for example, a cross-arm agitator or a helical ribbon impeller, or, in a further preferred form, in a plough-blade mixer.

Impregnation of the support material with co-catalyst solution can also take place in a fluidized bed. In that case, the active ingredient solution is applied, for example by spraying by means of a nozzle, to the support material which is fluidized by means of a stream of inert gas. Once the inert as has been freed of entrained solvent, it can be fed back into the reactor via an internal loop. The inert solvent can be re-used for preparing the active ingredient solution.

Since the co-catalyst system can react with air and/or moisture, it is advantageous to dry the solids powder D) before application of the co-catalyst solution, to remove the air and to maintain an inert gas atmosphere before, during and after application of the co-catalyst solution. Application of the co-catalyst solution is preferably so controlled that the added, preferably atomized, solution is immediately absorbed by the solid D). The formation of lumps and inhomogeneities is thus minimized.

The preparation of the catalyst system and/or supported co-catalyst according to the invention can also be carried out continuously.

Furthermore, by adjusting the ratio of the amount of supported co-catalyst material that is metered in to Nd catalyst that is present, it is possible to control the level of activity of the catalyst system. Preferably, the amount of co-catalyst solution applied to the solid should not be greater than the amount which the solid is able to absorb. Therefore, after application of the active ingredient solution, it is possible to continue stirring and agitating the solids powder gently as a free-flowing powder.

Although it is possible in principle to vary the amount of inert solvent used within wide limits, the amount is kept as small as possible, as discussed, for ecological and economical reasons. The amount is dependent on the amount and the solubility of the co-catalyst component(s) and on the pore volume/DBP adsorption of component D). An amount of from 10 to 2000 parts of the solvent, based on 100 parts of component D), is preferably used.

Preparation of the supported co-catalyst can take place in a wide temperature range. In general, the temperature is between the melting point and the boiling point of co-catalyst component B), or of the inert solvent. The operation is usually carried out at temperatures of from −20 to 100° C., preferably from 20 to 40° C.

In a preferred embodiment, the inert solvent is removed by distillation after the support material has been impregnated with active ingredient solution. The distillation can be carried out either in the same container in which the impregnation was carried out, or in a separate apparatus, for example a fluidized bed dryer. During removal of the solvent, the ingress of air and moisture must be avoided. Depending on the solvent used, the distillation is carried out at temperatures of from 0 to 150° C., preferably from 10 to 80° C., and at pressures of from 0.001 mbar to 20 bar absolute, preferably from 0.001 mbar to normal pressure. The distillation may also be carried out continuously. Without being worked up further, the condensate collected under inert conditions can be re-used as the solvent for the active ingredients used in the impregnation.

In a further preferred embodiment, the inert solvent is not removed.

The invention relates also to the use of the supported co-catalyst prepared according to the invention in a process for the polymerization of conjugated dienes, for example of 1,3-butadiene, isoprene, pentadiene or dimethylbutadiene, in the gas phase.

The polymerization is effected by bringing the gaseous conjugated diene into contact with the catalyst system described above or, inter alia, in EP-B-0647657 and with the supported co-catalyst prepared according to the invention. There may be added to the gaseous monomer further gases which serve either to dilute or to dissipate heat or to regulate the molecular weight. The polymerization can be carried out at pressures of from 1 mbar to 50 bar, preferably from 1 to 20 bar.

In general, the polymerization is carried out at temperatures of from −20 to 250° C., preferably from 0 to 200° C., particularly preferably from 20 to 160° C.

The polymerization can be effected in any apparatus suitable for a gas-phase polymerization. Thus, for example, a stirred reactor, a rotary reactor or a moving-bed reactor, or a combination of those reactor types, may be used.

The resulting polymers have a cis-1,4 double bond content of approximately from 60 to 99%. The molar weight can be altered by means of the composition of the catalyst and by varying the polymerization conditions. Molar weights of from $10^3$ to $10^6$, measured by GPC (gel-permeation chromatography as described, for example, in M. Hoffmann, H. Krömer, R. Kuhn, "Polymeranalytik 1", Georg Thieme Verlag, Stuttgart, 1977, p. 349 ff with universal calibration) are usual.

The Mooney viscosity, ML (1+4', 100° C.)) is usually in the range of from 30 to 180 ME. By means of the polymerization in the gas phase it is also possible to prepare very high molecular weight polymers, which are obtainable by means of solution polymerization only with an extremely high outlay owing to the high viscosity and the possibility of transfer reactions by the solvent used.

The resulting polymers can be compounded and vulcanized in the conventional manner.

In a common embodiment, the procedure for the polymerization of 1,3-butadiene is as follows:

The catalyst system described above or, inter alia, in EP-B-0647657, after previously being mixed with the co-catalyst system prepared according to the invention, or separately therefrom, is transferred to an apparatus which is suitable for keeping the pulverulent catalyst and the supported particulate co-catalyst in motion. That may be effected, for example, by stirring, by rotation and/or by means of a stream of gas. The inert gas, for example nitrogen, which is initially present in the gas chamber is replaced by the gaseous monomer, whereupon polymerization starts immediately and the temperature rises. The monomer, optionally diluted, is fed with an inert gas to the reactor at such a speed that the desired reaction temperature is not exceeded. The reaction temperature can be adjusted in the conventional manner by heating or cooling. The polymerization is terminated by shutting off the supply of monomer. The polymer can be treated further in the known manner, by deactivating the catalyst and treating the polymer with known anti-ageing agents.

The Examples which follow are intended to explain the use of the catalyst system described herein for the gas-phase polymerization of conjugated dienes, consisting of a rare earth compound, an organoaluminum compound, a further Lewis acid, optionally a conjugated diene, an inert, inorganic or organic support material and, additionally, a co-catalyst applied to an inorganic or organic support material, with an improvement in the flowability of the rubber produced thereby, but without limiting it to the Examples, as well as the unexpected and marked increase in activity when the co-catalyst system according to the invention is used in addition to the above-described catalyst system.

EXAMPLES

Example 1

1a) Pre-treatment of the support material for the co-catalyst:

Zeosil 1165 MP was used as the support material for the co-catalyst. Zeosil 1165 MP is an agglomerated precipitated silica from Rhône-Poulenc having a BET surface area of 139 m$^2$/g. The pore volume is 1.97 ml/g. Before it is used, the Zeosil 1165 MP is dried at 900° C. in a rotary tubular kiln, with a counter-current of nitrogen, and then filled into a container with the exclusion of air and moisture.

In addition, carbon black N115, a product from Degussa, was used as support material. The carbon black has a BET surface area of 145 m$^2$/g and a DBP adsorption of 113 ml/100 g. The average particle diameter is 485 μm. That material was dried for 32 hours at 450° C. under nitrogen and transferred and stored under nitrogen.

1b) Preparation of a supported co-catalyst

General comments:

Most of the pure or dissolved co-catalyst starting materials that are used and the finished supported co-catalyst are sensitive to air and moisture. Weighing, reaction and filling must be carried out following the Schlenck method with the exclusion of oxygen and moisture.

1000 g of pre-treated Zeosil 1165 are placed in a 10 liter double-walled vessel, under an inert gas, and mixed intensively by means of a slanting blade stirrer (100 rpm). A solution of 71 g (0.5 mol) of DIBAH in 876 g of hexane is pumped onto the support in the course of 3 hours. The internal temperature is to be from 20 to 30° C. After the coating, stirring is continued for 30 minutes at 20° C., and the hexane is then distilled off at 0.1 mbar and 50° C. 1055 g of a free-flowing white powder are obtained.

Example 2

The same general comments apply as in Example 1. The support material is pre-treated in the manner described in Example 1.

1000 g of pre-treated carbon black N 115 (from Degussa) are placed in a 10 liter double-walled vessel, under an inert gas, and mixed intensively by means of a slanting blade stirrer (100 rpm). A solution of 71 g (0.5 mol) of DIBAH in 600 g of hexane is pumped onto the support in the course of 3 hours. The internal temperature is to be from 20 to 30° C. After the coating, stirring is continued for 30 minutes at 20° C., and the hexane is then distilled off at 0.1 mbar and 50° C. 1060 g of a free-flowing black powder are obtained.

Polymerizations:

Example 3a

The polymerization was carried out in a 2 liter Büchi glass autoclave which was equipped with a helical ribbon impeller and was placed under a nitrogen pressure of 1 bar before the start of the reaction. 3 g of a Zeosil-supported catalyst, as described in EP-B-0647657, in this case coated with 3.7 mmol of Nd, 148 mmol of DIBAH, 3.7 mmol of EASC and 7.4 mmol of isoprene per 100 g of material, were fed into the reactor by means of a transfer tube, and the reaction temperature was so regulated via the jacket circuit that a temperature of 80° C. was able to establish itself in the stirred bulk material. The, polymerization was started by metering pre-heated gaseous butadiene into the reactor, a butadiene partial pressure of 2 bar being established. Despite jacket cooling, the temperature of the bulk material rose at the start of the reaction to approximately 84° C., after 10 minutes the entire course of the reaction could be carried out isothermally at 80° C. The test was carried out using a semi-batch procedure, i.e. the amount of butadiene consumed in the reaction was constantly metered back in, but not catalyst and not supported co-catalyst, and no product was discharged until the end of the test. In the glass reactor it was possible to observe clearly the growth, which was rapid from the very beginning of the stirred bulk material, which should also be described as a pseudo-fluidized bed owing to the vigorous mixing with the helical ribbon impeller, and, furthermore, a constant increase in the particle size of the product from a few 100 μm in diameter at the beginning to more than 1 mm in the end. During the course of the reaction, slight particle agglomerations occurred, but they did not substantially hinder mixing. The test was complete after 2½ hours.

After reaction of the residual butadiene remaining in the reactor, the product was discharged via a ball valve in the base plate of the reactor and was then immediately stopped and stabilized on the roller by mixing in 3 g of stearic acid and 3 g of Vulkanox BKF from Bayer AG.

The average polymerization activity of the catalyst system in this experiment was approximately 220 [kg of BR/(mol of Nd·bar of butadiene·h)].

Example 3b

The polymerization was carried out as in Example 3a), but in this case 4.5 g of the supported co-catalyst according to the invention of Example 1b) were fed into the reactor by means of the transfer tube together with the described Nd catalyst.

During this test, no particle agglomeration was observed. Moreover, a marked increase in the polymerization activity of the catalyst system was recorded, which on average was about 40% over 2½ hours. Initially the activity is about 30% above that measured in Example 3a), and even 50% above by the end of the reaction. This means, at the same time, that the relative decline in the polymerization activity with time is markedly less pronounced when the supported co-catalyst system is used, as compared with the system without supported co-catalyst.

Example 3c

The polymerization was carried out as in Example 3a), but in this case 4.5 g of a Zeosil previously pre-treated according to Example 1a) but not coated with DIBAH according to Example 1b) were fed into the reactor by means of the transfer tube together with the described Nd catalyst.

During this test, no particle agglomeration was observed. Over the entire reaction period, the polymerization activity corresponded to that of Example 3a) within the scope of reproducibility accuracy.

Example 4a

The polymerization was carried out as in Example 3a), there being used 3 g of a catalyst supported on carbon black, as described at the beginning or, inter alia, in EP-B-0647657, with a coating of 3.7 mmol of Nd, 148 mmol of DIBAH, 3.7 mmol of EASC and 7.4 mmol of isoprene per 100 g of material. Despite jacket cooling, the temperature of the bulk material rose at the start of the reaction to approximately 86° C., after 15 minutes the entire course of the reaction could be carried out isothermally at 80° C. During the course of the reaction, slight particle agglomerations occurred, but they did not substantially hinder mixing. The test was complete after 2½ hours.

After reaction of the residual butadiene remaining in the reactor, the product was discharged via a ball valve in the base plate of the reactor and was then immediately stopped and stabilized on the roller by mixing in 3 g of stearic acid and 3 g of Vulkanox BKF from Bayer AG.

The average polymerization activity of the catalyst system in this experiment was approximately 450 [kg of BR/(mol of Nd·bar of butadiene·h)].

Example 4b

The polymerization was carried out as in Example 4a), but in this case 12 g of the supported co-catalyst according to the invention of Example 2) were fed into the reactor by means of the transfer tube together with the described Nd catalyst.

During this test, no particle agglomeration was observed. Moreover, a marked increase in the polymerization activity of the catalyst system was recorded, which on average was about 63% over 2½ hours. Initially the activity is about 50% above that measured in Example 4a), and even 80% above by the end of the reaction. In this case too, the relative decline in the polymerization activity with time is markedly less pronounced when the supported co-catalyst system is used, as compared with the system without supported co-catalyst.

Example 4c

The polymerization was carried out as in Example 4a), but in this case 20 g of a carbon black previously pre-treated according to Example 1a) but not coated with DIBAH according to Example 2) were fed into the reactor by means of the transfer tube together with the described Nd catalyst.

During this test, no particle agglomeration was observed. Over the entire reaction period, the polymerization activity corresponded to that of Example 4a) within the scope of reproducibility accuracy.

We claim:

1. A catalyst system comprising
   A) a rare earth alcoholate (I),
      a rare earth carboxylate (II),
      a complex compound of rare earths with diketones (III) and/or
      an addition compound of the rare earth halides with an oxygen or nitrogen donor compound (IV), of the following formulae:

  (I)

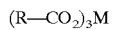  (II)

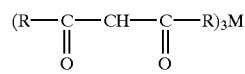  (III)

and

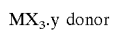  (IV),

B) an aluminum trialkyl, a dialkylaluminum hydride of formula (V) and/or an alumoxane of formulae (VI) to (VII):

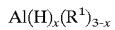  (V)

(VI)

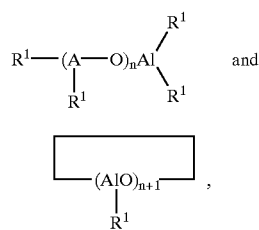

and (VII)

wherein in the formulae
   the radicals R, which may be the same or different, represent an alkyl radical having $C_1$–$C_{20}$,
   M represents a trivalent rare earth element having an atomic number from 57 to 71,
   X represent chlorine, bromine or iodine,
   x represent 0 or 1,
   y represents from 1 to 6, and
   n represents from 1 to 50,
   the radicals $R^1$, which may be the same or different, represent an alkyl radical having $C_1$–$C_{10}$,
   C) an additional Lewis acid, and
   D) an inert, particulate, inorganic or organic solid having a specific surface area greater than 10 $m^2$/g (BET) and a pore volume of from 0.3 to 15 ml/g and, where carbon black is used, additionally having a DBP adsorption of from 10 to 300 ml/100 g, wherein the components A, B, and C are applied to the component D,
   and, additionally, a co-catalyst applied to an inorganic or organic support material wherein said co-catalyst applied to an inorganic or organic support material is used in amounts of from 0.1 to 50 wt. %, based on the amount of fixed or fluidized bed.

2. The catalyst system according to claim 1, wherein said inorganic or organic support material for the co-catalyst is selected from the group consisting of silica, carbon black, precipitated silicas, zeolites, clay, talcum, organic solids and mixtures thereof.

3. The catalyst system according to claim 1, wherein said inorganic or organic support material for the co-catalyst is agitated during application of the co-catalyst.

4. The catalyst system according to claim 1, wherein said inorganic or organic support material is dried before the application of the co-catalyst, freed of oxygen and maintained under an inert gas atmosphere before, during and after application of the co-catalyst.

5. The catalyst system according to claim 1, wherein the rate of application of the co-catalyst to an inorganic or organic support material is so controlled that the added co-catalyst is immediately absorbed by the inorganic or organic support material.

6. The catalyst system according to claim 1, wherein the level of activity of said catalyst system is adjusted by means of the ratio of supported co-catalyst to remaining catalyst system.

7. The catalyst system according to claim 1, wherein said inorganic or organic support material for the co-catalyst is coated uniformly with active ingredients.

8. The catalyst system according to claim 1, wherein said inorganic or organic support material for the co-catalyst having a particle size of from about 10 to 1000 μm is used.

9. The catalyst system according to claim 1, wherein said catalyst system is prepared wholly or in individual components in a fluidized-bed reactor.

10. The process for the polymerization of conjugated dienes with a catalyst system in the gas phase, wherein said catalyst system comprising
    A) a rare earth alcoholate (I),
       a rare earth carboxylate (II),
       a complex compound of rare earths with diketones (III) and/or
       an addition compound of the rare earth halides with an oxygen or nitrogen donor compound (IV), of the following formulae:

  (I)

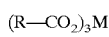  (II)

(III)

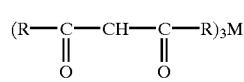

and

  (IV),

B) an aluminum trialkyl, a dialkylaluminum hydride of formula (V) and/or an alumoxane of formulae (VI) to (VII):

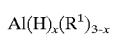  (V)

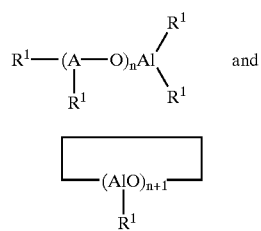

wherein in the formulae
the radicals R, which may be the same or different, represent an alkyl radical having $C_1$–$C_{20}$,
M represents a trivalent rare earth element having an atomic number from 57 to 71,
X represent chlorine, bromine or iodine,
x represent 0 or 1,
y represents from 1 to 6, and
n represents from 1 to 50,
the radicals $R^1$, which may be the same or different, represent an alkyl radical having $C_1$–$C_{10}$, C) an additional Lewis acid, and D) an inert, particulate, inorganic or organic solid having a specific surface area greater than 10 $m^2$/g (BET) and a pore volume of from 0.3 to 15 ml/g and, where carbon black is used, additionally having a DBP adsorption of from 10 to 300 ml/100 g, wherein the components A, B, and C are applied to the component D, and, additionally, a co-catalyst applied to an inorganic or organic support material is used wherein said co-catalyst applied to an inorganic or organic support material is used in amounts of from 0.1 to 50 wt. %, based on the amount of fixed or fluidized bed.

* * * * *